(12) United States Patent
Linortner et al.

(10) Patent No.: US 7,946,401 B2
(45) Date of Patent: May 24, 2011

(54) MULTI-DISK CLUTCH

(75) Inventors: Thomas Linortner, Graz (AT); Manfred Rahm, Eisbach-Rein (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 605 days.

(21) Appl. No.: 12/151,679

(22) Filed: May 8, 2008

(65) Prior Publication Data

US 2008/0277231 A1    Nov. 13, 2008

(30) Foreign Application Priority Data

May 8, 2007   (DE) .................. 10 2007 021 599

(51) Int. Cl.
*F16D 13/52* (2006.01)
*F16D 13/69* (2006.01)

(52) U.S. Cl. ............... 192/70.28; 192/82 T; 192/109 R

(58) Field of Classification Search .................. None
See application file for complete search history.

(56) References Cited

U.S. PATENT DOCUMENTS

| | | | |
|---|---|---|---|
| 3,913,713 A | 10/1975 | F'Geppert | |
| 4,683,997 A * | 8/1987 | Stockmar et al. | 192/82 T |
| 4,844,219 A * | 7/1989 | Stockmar | 192/70.28 |
| 5,211,267 A * | 5/1993 | Clark | 192/82 T |
| 5,454,457 A | 10/1995 | Sakai et al. | |
| 6,427,821 B1 | 8/2002 | Lee | |

FOREIGN PATENT DOCUMENTS

| | | |
|---|---|---|
| DE | 24 53 562 | 5/1976 |
| DE | 35 29 232 | 1/1987 |
| DE | 39 07 385 | 10/1989 |
| DE | 44 06 071 | 9/1994 |
| DE | 43 43 917 | 6/1995 |
| JP | 2005098454 A | 4/2005 |

* cited by examiner

*Primary Examiner* — Rodney H Bonck
(74) *Attorney, Agent, or Firm* — Harness, Dickey & Pierce, P.L.C.

(57) ABSTRACT

A multi-disk clutch having a plurality of interengaging disks movable along a longitudinal clutch axis and a resetting device for the mutual release of adjacent disks along a release distance, with the release distance being bounded by an abutment device. The abutment device includes at least one contact section of a clutch part movable along the longitudinal clutch axis and at least one contact section of an axially fixed clutch part, with the moving clutch part and the axially fixed clutch part having different thermal coefficients of expansion and with the contact sections at both sides cooperating such that the bounding of the release distance varies in dependence on the temperature, with at least one of the contact sections having a sloping surface.

24 Claims, 5 Drawing Sheets

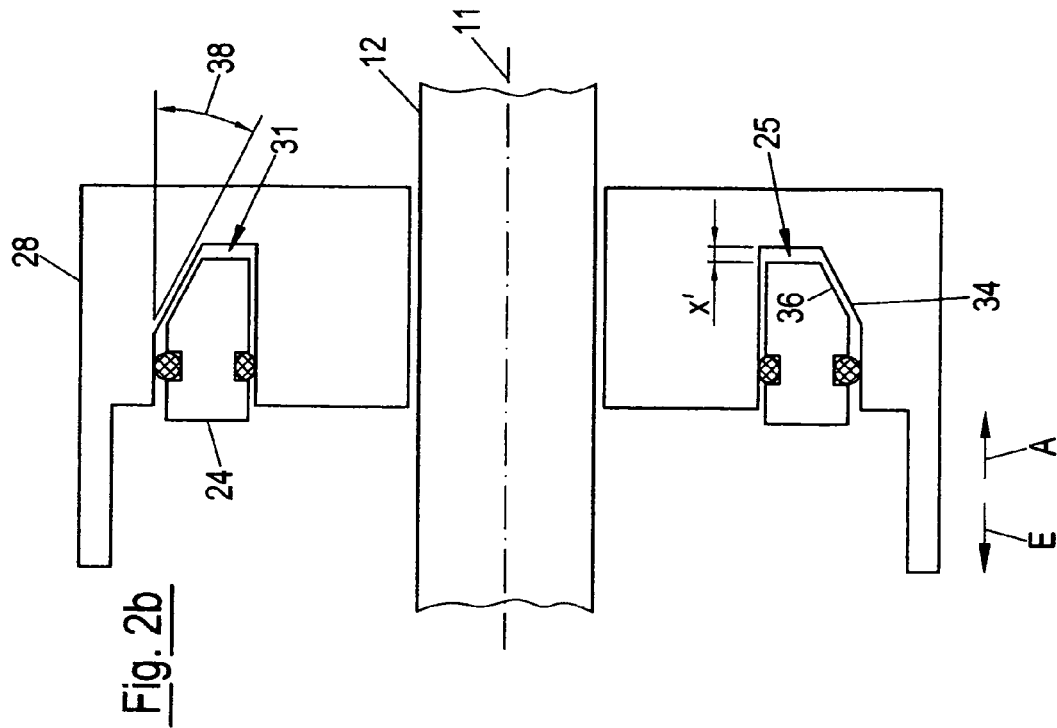
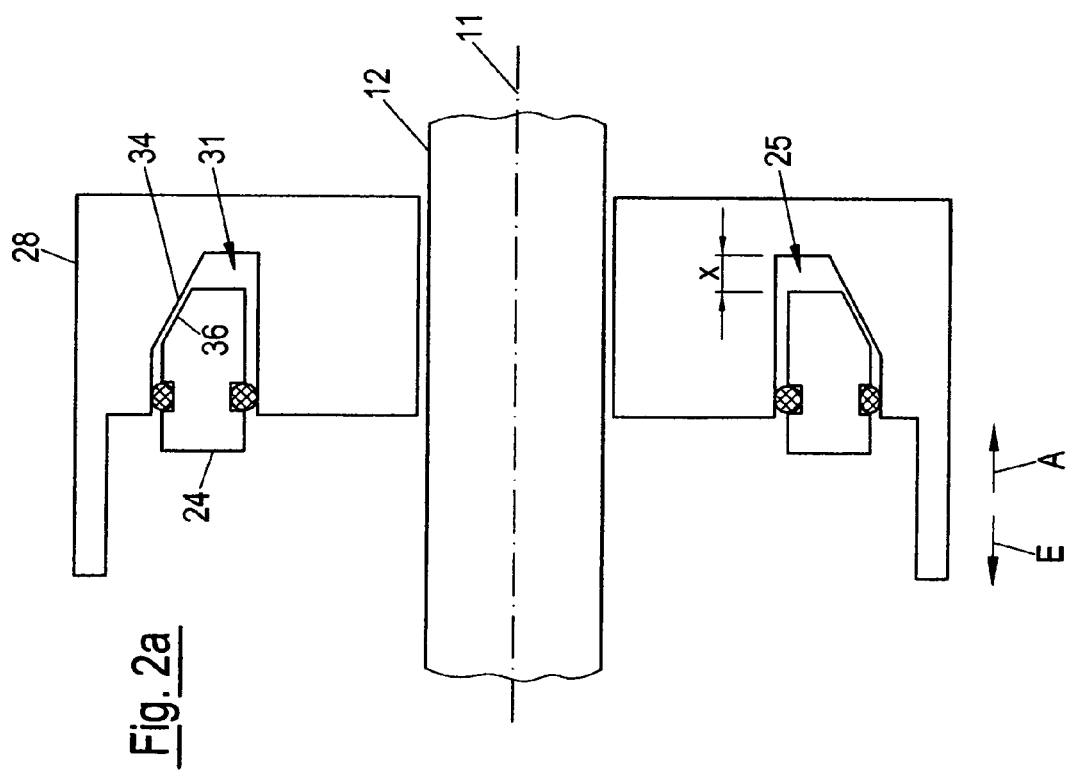

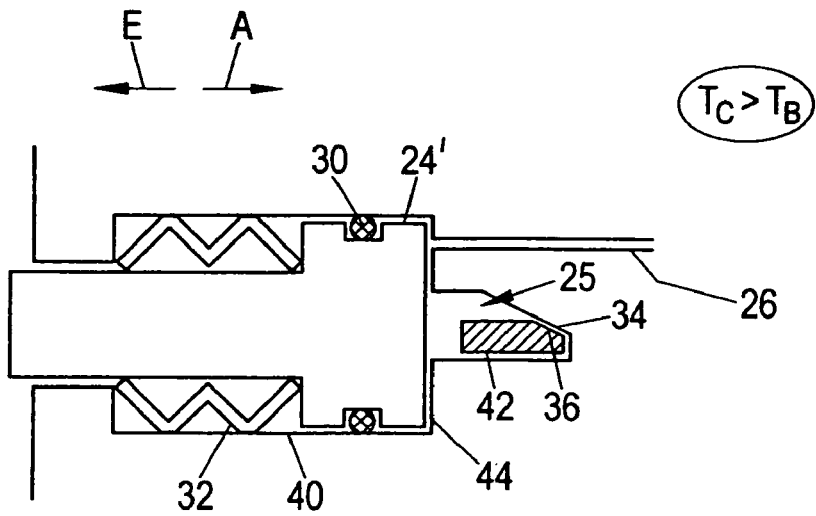
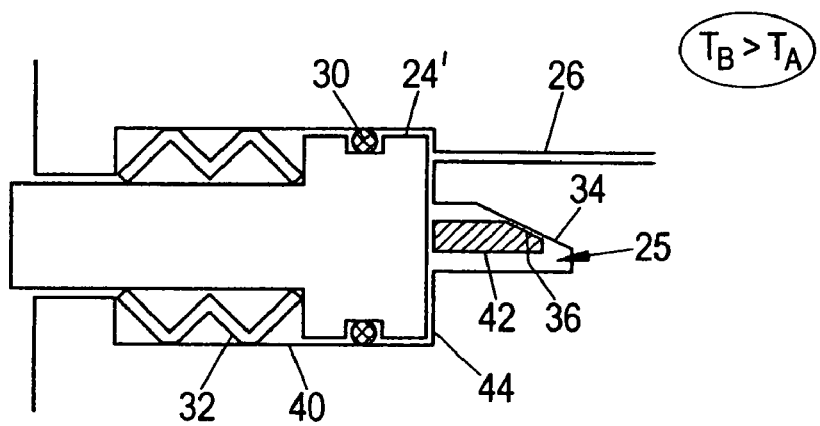
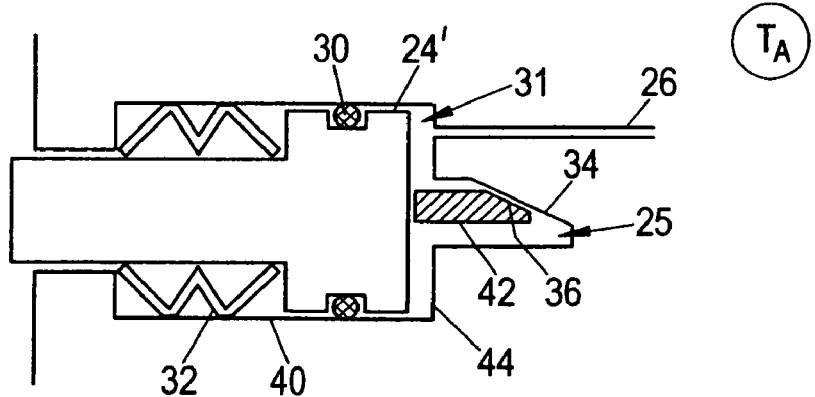

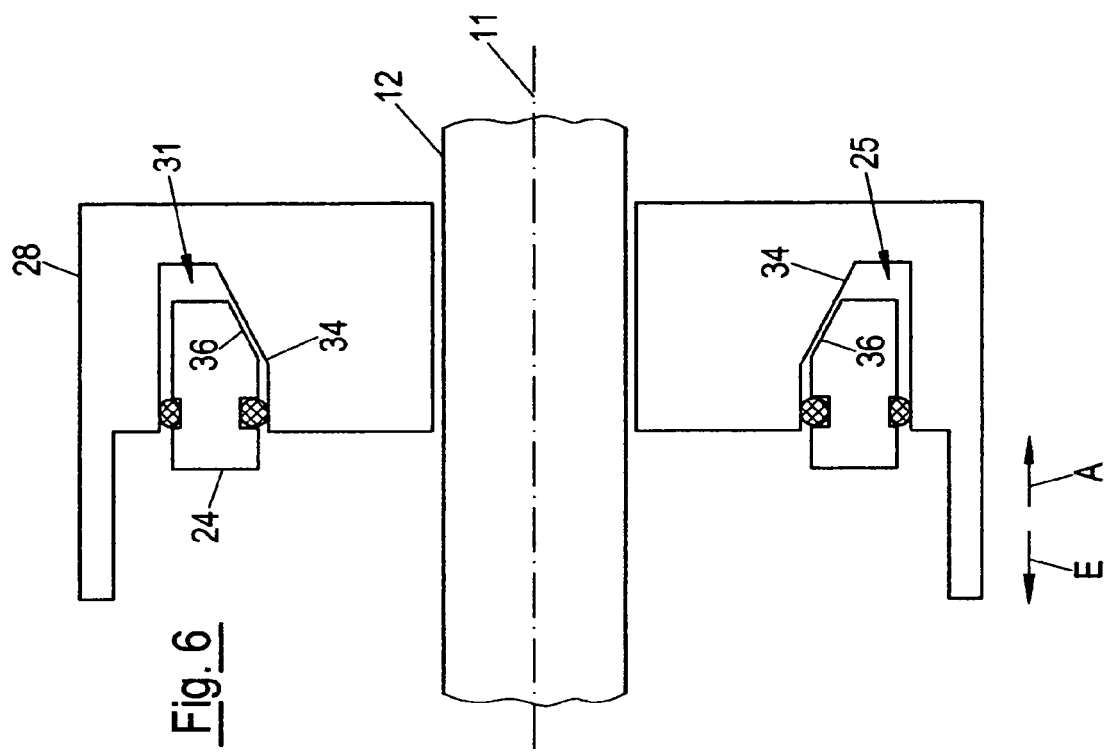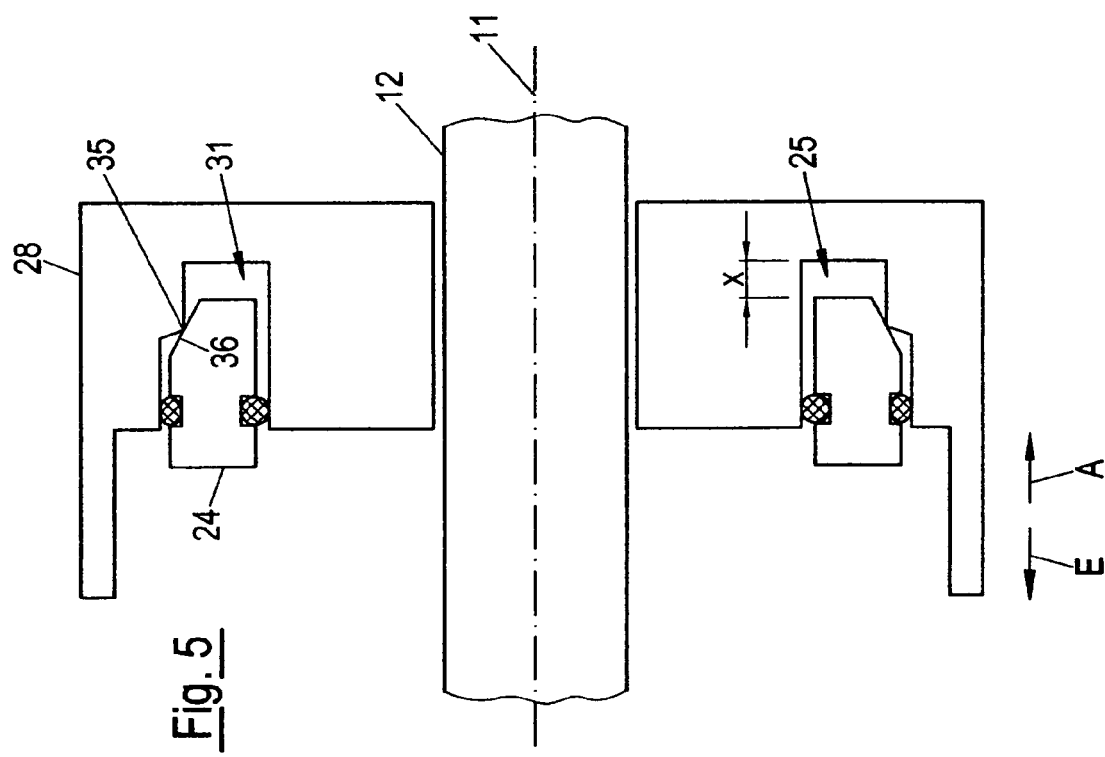

MULTI-DISK CLUTCH

FIELD

The present disclosure relates to a multi-disk clutch for motor vehicles.

BACKGROUND

The statements in this section merely provide background information related to the present disclosure and may not constitute prior art.

Multi-disk clutches are, for example, components frequently used in automotive engineering for the transmission of a torque or for the braking of a rotary movement. Multi-disk clutches of this type include internal disks rotationally fixedly connected to a clutch hub and external disks rotationally connected to a clutch basket. The internal and external disks are arranged alternately so that the disks are pressed together by axial actuation of the clutch. During the pressing together, the friction between the internal disks and the external disks increases, whereby the torque transmitted between the clutch hub and the clutch basket increases.

Multi-disk clutches of this type are generally known and are used in transmissions of different types, for example.

Drag torques in particular occur in oil-lubricated (wet running) multi-disk clutches in an open (disengaged) state of the clutch. In this connection, a torque is also transmitted between the clutch hub and the clutch basket in the disengaged state due to the viscosity of the oil, with the drag torque decreasing as the distance of the disks increases. To keep the drag torques small, multi-disk clutches have to be "opened" on disengaging. In this connection, adjacent disks are removed from one another directly or indirectly by a resetting device, for example in that a piston previously pressing the disks together is moved away from the disks until it adopts a disengaged position (abutment position) and thus liberates the disks for a mutual release. Provision is thus made by the resetting device that the disks again adopt a mutually spaced part position so that no-load torques or drag torques are minimized.

The setting dynamics of the clutch are defined, on the one hand, by the time duration to the passing through of the release distance and, on the other hand, by the time duration to the passing through of the clutch distance for the desired clutch torque. No real torque is yet transmitted—apart from a drag torque—during the passing through of the release distance. Such a dead time (i.e., the time from the demand for the torque until a torque is actually transmitted) degrades the response dynamics of the clutch and should, therefore, be minimized where possible.

With conventional clutches, much higher setting times or dead times are observed in a cold state (low temperature range), for example, shortly after putting the vehicle into operation, than in a warm state (operating temperature range). As the warming up of the clutch progresses, the setting dynamics of the multi-disk clutch improves again. The unsatisfactory setting dynamics in the temperature range is, for example, due to the fact that an electrically operated planetary rotor pump provided for the actuation of the clutch has poorer performance characteristics at low temperatures.

With some clutches, it is also seen that temperature fluctuations within the operating temperature range of the clutch have an effect on the setting times in an unwanted manner. This effect is considered due to a different thermal expansion of the different areas of the clutch which accompanies a change in the release distance.

SUMMARY

The present disclosure provides a multi-disk clutch which has improved setting dynamics properties.

The multi-disk clutch includes an abutment device bounding a release distance, with the abutment device including at least one contact section of a clutch part movable along a longitudinal clutch axis and at least one contact section of an axially fixed clutch part, with the moving clutch part and the axially fixed clutch part having different thermal coefficients of expansion and with the contact sections at both sides cooperating such that the bounding of the release distance varies in dependence on the temperature, with at least one of the contact sections having a sloping surface.

In other words, the release distance of the multi-disk clutch is set in dependence on the temperature such that the release distance is reduced, for example, at low temperatures (i.e., before reaching the operating temperature range of the clutch). The abutment position of the disks or of a piston of the clutch is, therefore, displaced in the engagement direction for low temperatures. On the one hand, the dead time falls in this case because a smaller release distance has to be passed through before the clutch engages in the engagement process. On the other hand, in the disengaged state, due to disks spaced less far apart from one another, an increased drag torque occurs which contributes to a faster warming of the clutch, whereby the clutch reaches the operating temperature range faster so that the setting dynamics improves. As the temperature rises, the release distance is increased again to reduce the drag torque in the disengaged state. The abutment device of the multi-disk clutch, therefore, provides a fast warming of the clutch to reach the required setting dynamics, with increased drag torques in the low temperature range deliberately being accepted.

Alternatively, the clutch may also serve to compensate for temperature fluctuations within the operating temperature range of the clutch so that the release distance and thus the setting time are substantially independent of the temperature within the operating temperature range. The clutch may hereby be optimized to a specific release distance, with different temperature expansions being very largely compensated, for example, by the clutch housing and the actuation piston. In this case, the abutment position of the disks or of the piston of the clutch is displaced in the direction of engagement, for example, for increased temperatures within the operating temperature range.

For the purpose of the temperature dependent displacement of the abutment position, the abutment device includes a moving clutch part and an axially fixed clutch part which have different thermal coefficients of expansion. On temperature changes of the clutch, variations result in the geometrical ratios between the movable clutch part and the axially fixed clutch part since the two clutch parts expand at different rates as the temperature rises. Both the movable clutch part and the axially fixed clutch part have contact sections which contact one another and cooperate such that the abutment position of the movable clutch part is variable in the axial direction in dependence on the temperature. This is achieved in that at least one of the contact sections has a sloping surface (i.e., the respective contact section is slopingly inclined with respect to the longitudinal clutch axis). The temperature dependent setting of the release distance is produced by the cooperation of the different thermal expansion of the clutch parts and their geometrical design (sloping surface).

The multi-disk clutch may include an abutment device whose movable clutch part has a lower thermal coefficient of expansion than the axially fixed clutch part (e.g. piston or abutment element made of steel and clutch housing of aluminum). However, a reverse configuration is also possible (i.e., the movable clutch part can have a larger thermal coefficient of expansion than the axially fixed clutch part.) The alignment of the named sloping surface may be selected depending on the desired compensation effect.

The named contact sections at both sides may have an extent rotationally symmetrical with respect to the longitudinal clutch axis. The temperature dependent different expansion thus takes place substantially in the radial direction, whereby axial adjustment distances can be set particularly effectively by means of the at least one sloping surface. The named contact sections, can in this respect, extend along individual peripheral sections or continuously along the total periphery (i.e. as a closed ring) with respect to the longitudinal clutch axis.

In another configuration of the two contact sections, provision is made for both the contact section of the axially movable clutch part and the contact section of the axially fixed clutch part to be formed by a respective sloping surface. A substantially areal cooperation of the two contact sections thereby results. Alternatively, only one of the two contact sections may be formed by a sloping surface, whereas the other contact section may be formed by an edge (e.g. ring edge) cooperating with the sloping surface. In this case, a substantially linear cooperation of the two contact sections results.

The moving clutch part may be designed as an actuable piston. In other words, a piston that exerts the required actuation force for the pressing together of the disks on the engagement of the clutch cooperates directly with the axially fixed clutch part over the named sloping surface so that its abutment position is temperature dependent with a disengaged clutch. The piston may be a ring shaped piston.

The piston may be hydraulically actuable. In a particularly space-saving configuration of the abutment device, the named contact sections may be arranged within a hydraulic pressure space.

In accordance with another configuration of the multi-disk clutch, the axially movable clutch part may be made as an abutment element that bounds the travel path of an axially movable piston. In this configuration, the abutment element makes provision that the release distance is adjustable dependent on the temperature (i.e., for example, it is smaller in a cold state of the clutch than at a normal operating temperature). The abutment element may be ring shaped.

Provision can be made for the axially fixed clutch part to have a cut-out in which the contact section of the axially fixed clutch part and at least a part of the movable clutch part are arranged. This configuration enables a simple, but efficient design of the abutment device which is moreover also space saving and robust.

In order, for example, to compensate for any manufacturing tolerances of the clutch, the axially fixed clutch part may include at least one replaceable adjustment element that is arranged in the cut-out. The clutch can thus be adjusted simply and cost effectively by the use of a suitable adjustment element without complex shaping being required at clutch components themselves.

In accordance with another configuration of the multi-disk clutch, the contact section of the axially fixed clutch part may be formed at the adjustment element. Even more exhaustive and more precise possibilities thus result for the adjustment of the clutch.

To be able to absorb mechanical strains due to different thermal expansion of the different components, the at least one adjustment element may have at least one expansion joint or interruption. There is thus thereby less of a restriction in the selection of the material of the adjustment element, for example, and it may thus be produced more cost effectively.

A particularly efficient temperature dependent bounding of the release distance may be achieved by a ring shaped design of the cut-out, of the optionally present abutment element and/or of the adjustment element, when the bounding takes account of the substantially rotationally symmetrical geometry of a multi-disk clutch.

Further areas of applicability will become apparent from the description provided herein. It should be understood that the description and specific examples are intended for purposes of illustration only and are not intended to limit the scope of the present disclosure.

DRAWINGS

The invention will be described in the following purely by way of example with reference to advantageous embodiments and to the drawings. There are shown:

FIGS. 2a and 2b are schematic representations for the illustration of the mode of action of an abutment device;

FIGS. 3a to 3c are schematic representations of the multi-disk clutch including the abutment device;

FIGS. 5 and 6 are schematic representations of an abutment device.

DETAILED DESCRIPTION

Figure 1:
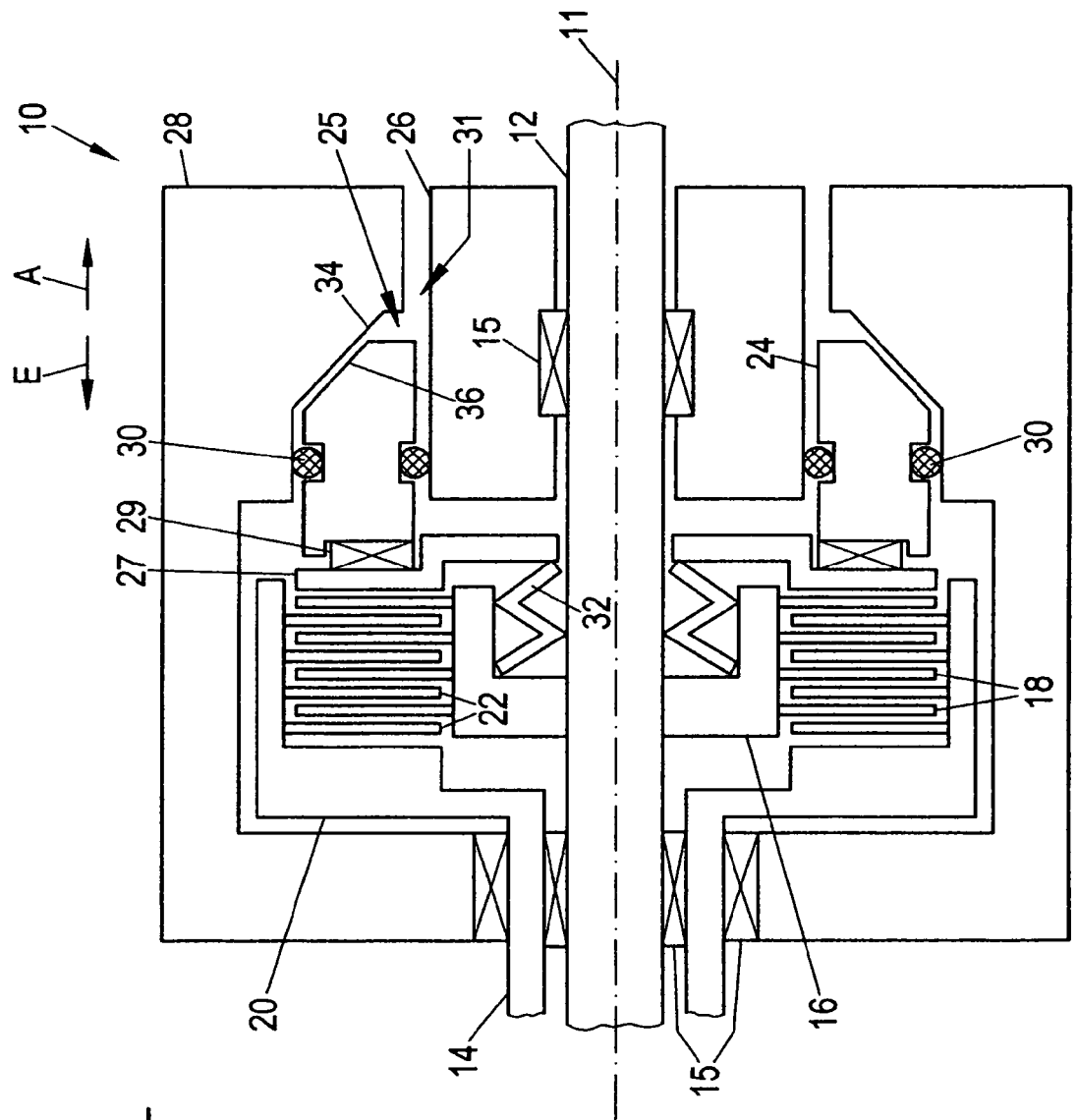
FIG. 1 is a schematic representation of the multi-disk clutch.

The following description is merely exemplary in nature and is not intended to limit the present disclosure, application, or uses. It should be understood that throughout the drawings, corresponding reference numerals indicate like or corresponding parts and features.

FIG. 1 shows a multi-disk clutch 10 which has a structure substantially rotationally symmetrical to a longitudinal clutch axis 11. The multi-disk clutch 10 serves for the transmission of a torque from a shaft 12 to a hollow shaft 14. The shaft 12 and the hollow shaft 14 are supported by shaft bearings 15. The shaft 12 has a hub 16 which is meshed with internal disks 18. The hollow shaft 14 merges into a clutch basket 20 within the multi-disk clutch 10. The clutch basket 20 is rotationally fixedly connected to external disks 22.

The multi-disk clutch 10 includes a plurality of internal clutches and external clutches 18, 22 arranged alternately, which are axially displaceable with respect to the axis 11. When a torque is transmitted from the shaft 12 to the hollow shaft 14, the disks 18, 22 are pressed together in an engagement direction E by an axial actuation of a piston 24 what is arranged partly in a substantially ring shaped cut-out 25 of a clutch housing 28 so that they contact one another.

A torque is transmitted from the shaft 12 via the hub 16 onto the clutch basket 20 and thus also onto the hollow shaft 14 by the mutual friction of the disk surfaces. The transmitted torque may be controlled by the actuation force, which is exerted by the piston 24 onto the disks 18, 22. A pressure ring 27 and an axial bearing 29 are arranged between the piston 24 and the disks 18, 22. The piston 24 is decoupled by the axial bearing 29 from a rotary movement of the pressure ring 27, which rotates around the longitudinal clutch axis 11 together with the shaft 12 and the components connected thereto.

The actuation of the piston 24 may take place hydraulically, for example. For this purpose, piston pressure lines 26 are provided by which pressurized hydraulic fluid can be supplied to the cut-out 25 so that the piston 24 is moved in the engagement direction E. Sealing rings 30 are provided between the piston 24 and the clutch housing 28. The part of the cut-out 25 bounded by the sealing rings 30 and remote from the disks 18, 22 forms a hydraulic pressure space 31. The actuation of the piston 24 may also take place in another manner such as, for example electromagnetically.

To end or reduce torque transmission, the hydraulic fluid pressure in the piston pressure lines 26 is lowered. The piston 24 is moved in a disengagement direction A by the effect of a resetting device, which is formed by plate springs 32 in the clutch 10 shown. The disks 18, 22 may hereby release from one another in the axial direction, with the disks 18, 22 covering a so-called release distance. This release distance or the disengagement movement of the piston 24 is bounded in the disengagement direction A by the cooperation of an abutment slope 34 formed at the housing 28 with a slope 36 of the piston 24.

The bounding of the disengagement movement of the piston 24 will be described in the following for an improvement of the setting dynamics in a low temperature range of the clutch with reference to FIGS. 2a and 2b, with only those components being shown which are relevant to the understanding of the principle action.

FIG. 2a shows the position of the piston 24 in a disengaged state of the clutch 10, with the clutch 10 being "cold" (low temperature range). The plate spring 32 not shown in this illustration presses the piston 24 into the cut-out 25 until the slope 36 at the piston side contacts the abutment slope 34. Because the ring shaped piston 24 has a fixedly defined diameter in the radial direction, it cannot penetrate further into the cut-out 25.

The position of the piston 24 of the disengaged clutch 10 in the heated state (operating temperature range) is shown in FIG. 2b. Due to the different thermal coefficients of expansion of the materials from which the piston 24 and the clutch housing 28 are made, the piston 24 and the housing 28 expand at different rates as the temperature rises. In the configuration shown, the clutch housing 28 is, for example, made from aluminum, whereas the piston 24 is made of steel.

Since the aluminum housing 28 expands more than the steel piston 24, the radius of the cut-out 25 enlarges more than the radius of the piston 24—with respect to the longitudinal clutch axis 11. The slope 36 at the piston side, therefore, cooperates with a region of the abutment slope 34 disposed lower in the cut-out 25 in the disengaged state. Consequently, the steel piston 24 can penetrate more deeply into the cut-out 25, whereby the release distance of the multi-disk clutch 10 is enlarged in comparison with the situation in the cold state (low temperature range, cf. FIG. 2a). This is desired in this case since, after reaching an operating temperature, an additional warming of the clutch 10 is no longer required and drag torques of the disks 18, 22 should be minimized.

In other words, the abutment of the piston 24—and thus also the release distance—depends on the temperature of the clutch 10. The temperature dependent penetration depth of the piston 24 into the cut-out 25 is illustrated by the different distances X and X' (FIGS. 2a and 2b).

Due to the lower release distance at lower temperatures, the dead time of the clutch 10 on its actuation is reduced, on the one hand; on the other hand, the disks 18, 22 are not maximally opened (i.e., the maximum possible distance between the individual disks 18, 22 is not reached). The drag torque that occurs more pronouncedly as a result is, however, desired at low temperatures since the clutch 10 is thereby heated and thus reaches its operating temperature faster.

It must be noted that the piston 24 is preferably designed such that it only changes its dimensions due to temperature changes. The piston 24 should not be deformed by the action of the resetting device in order to be pressed more deeply into the cut-out 25.

The temperature dependence of the abutment position may be influenced by the selection of different materials with suitable heat coefficients and/or by the selection of a suitable slope angle 38, with the slope angle 38 in the configuration shown being the angle between the longitudinal axis 11 and the surface of the abutment slope 34. The slope angle 38 and the corresponding angle of the slope 36 at the piston side are preferably substantially the same.

FIGS. 3a to 3b show another configuration of the multi-disk clutch 10 with a section only being shown including the piston 24' and the resetting device (plate spring 32). An improvement of the setting dynamics in a low temperature range is again desired here. The temperature T of the multi-disk clutch 10 increases from FIG. 3a to FIG. 3c.

FIG. 3a shows the ring piston 24' which is arranged movably in a piston space 40. The hydraulic pressure in the hydraulic pressure space 31 to the right of the sealing rings 30 of the piston 24' may be increased via the pressure line 26 so that the piston 24' moves in the engagement direction E against the spring force of the plate spring 32. The disks 18, 22 not shown in FIGS. 3a to 3c are acted on by an actuation force by this movement of the piston 24', whereby the clutch 10 is engaged and a torque is transmitted from the shaft 12, not shown, to the basket 20, likewise not shown.

The abutment of the piston 24' is formed in FIG. 3a by an abutment element 42 that is rotationally symmetrical, i.e. substantially ring shaped, with respect to the longitudinal clutch axis 11. The abutment element 42 acts in an analogous manner to the piston 24 shown in FIGS. 2a and 2b. In other words, the abutment point of the piston 24' formed by the abutment element 42 in a disengaged position of the clutch 10 in the low temperature state in accordance with FIG. 3a is still disposed with respect to the disengagement direction A in front of an end abutment which is formed by the rear wall 44 of the piston space. As state above, the release distance is thereby reduced at low temperatures.

In contrast to the configuration described with reference to FIGS. 1, 2a and 2b, the abutment device is not formed at the piston 24', but includes a separate abutment element 42. This form of the temperature dependent abutment boundary may be realized simply and cost favorably.

With respect to FIG. 3a, the temperature of the clutch 10 is increased in FIG. 3b ($T_B > T_A$). The clutch temperature $T_B$ may, for example, correspond to an ambient temperature of approximately 20° C. In the embodiment shown, the abutment element 42 terminates in a flush manner with the rear wall 44 of the piston space at this temperature $T_B$. If the temperature of the clutch 10 rises even further (FIG. 3c: $T_C > T_B$), the abutment element could penetrate even more deeply into the cut-out 25. This would then, however, no longer have an influence on the position of the end abutment which is fixed by the rear wall 44 or the piston space.

Different thicknesses may be provided in the axial direction for the piston 24 in accordance with FIGS. 1, 2a, 2b or for the abutment element 42 in accordance with FIGS. 3a to 3c to be able to compensate production related tolerances determined by an ex works measurement of the clutch 10. A suitable thickness of the piston 24 and of the abutment element 42 is therefore selected in dependence on the determined tolerances for a specific clutch 10 so that the piston 24 and the abutment element 42 at the same time serve as the adjustment element.

In FIGS. 4a to 4d, different examples of a separate adjustment element 46, 46', 46" are shown, which may be used for the fine tuning of the abutment position of the piston 24, 24' in order, for example, to compensate production related tolerances of the clutch components. The adjustment elements 46, 46', 46" may have different dimensions, shapes and thicknesses D, D' and are inserted into the cut-out 25, 25'. They are exchangeable, whereby wear effects of the clutch 10 may, for example, also be compensated. The adjustment elements 46, 46', 46" are ring shaped components, which may be manufactured simply and cost effectively from a technical production aspect and which have expansion joints or an interruption (e.g. slot) along their periphery as required to be able to adapt to the temperature dependent variation of the cut-out geometry.

Figure 4A:
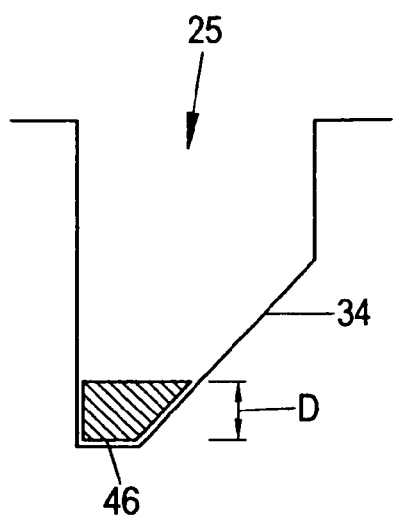
FIGS. 4a to 4d are schematic representations of adjustment elements.

The adjustment element 46 shown in FIG. 4a serves for the fixing of a maximum penetration depth of the piston 24 or of the abutment element 42 into the cut-out 25. The adjustment element 46 substantially fills the cut-out 25 in part, whereby the effective cross-section of the cut-out 25 varies.

Figure 4B:
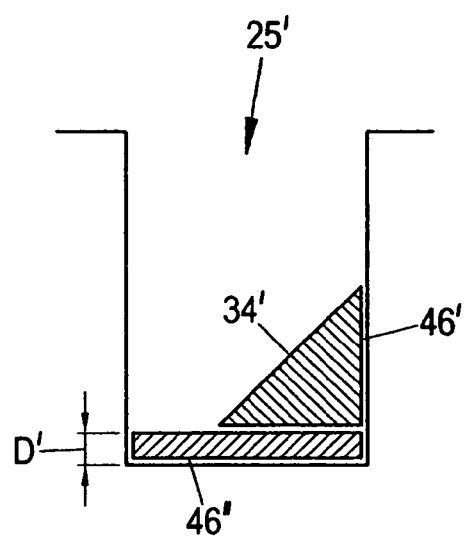
Figure 4C:
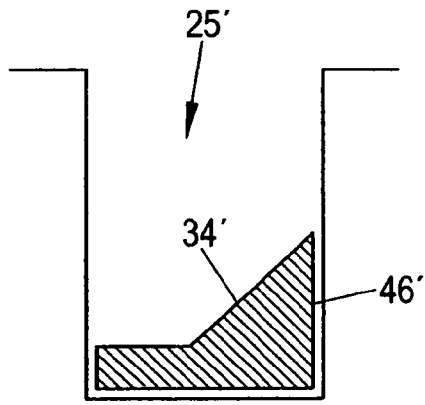

FIG. 4b shows a cut-out 25' with a substantially rectangular cross-section. The abutment slope 34' is formed at the adjustment element 46'. In addition, an adjustment element 46" with a rectangular cross-section of the thickness D' is provided by which the effective depth of the cut-out is reduced. Instead of a separate adjustment element 46", different adjustment elements 46' having different thicknesses in the axial direction may also be used, as is shown in FIG. 4c. A special advantage of this embodiment consists of the abutment slope 34' simultaneously being formed by the adjustment element 46' such that no special embodiment of the cut-out 25' is required.

It is preferred that the adjustment elements 46, 46', 46" and the clutch housing 28 substantially have the same thermal coefficients of expansion or are made from the same material. In special cases, however, a different material may also be used for the manufacture of the adjustment elements 46, 46', 46".

FIG. 5 shows a view of a further configuration of an abutment device of a multi-disk clutch corresponding to the representation in accordance with FIG. 2a, with the same parts as in the configurations described in the preceding being marked by the same reference numerals. An improvement of the setting dynamics in a low temperature range of the clutch operation should also be achieved here. In this embodiment, the slope 36 of the piston 24 cooperates in the manner of a ball joint with an abutment edge 35, which is formed at a ring shoulder of the clutch housing 28. The contact sections (slope 36 and abutment edge 35) at both sides thus only cooperate along a ring shaped line. Such a ring shaped edge as a contact section for the associated slope 36 may naturally also be provided for an abutment element 42 such as was explained in connection with FIGS. 3a to 3c. The arrangement of slope and abutment edge may generally also be swapped over.

Figure 4D:
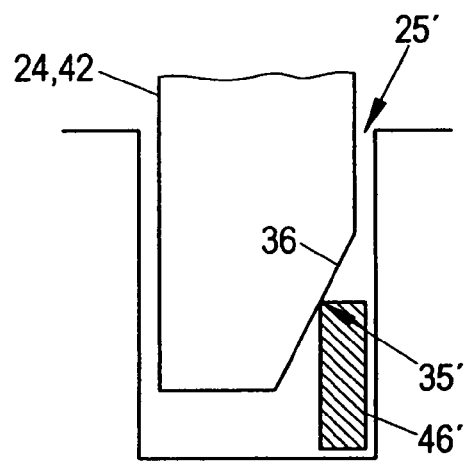

FIG. 4d illustrates that such an abutment edge 35' may also be formed at an adjustment element 46', i.e. instead of the abutment slope 34' shown in FIGS. 4b and 4c.

In the embodiments explained in connection with FIGS. 1 to 5, an improvement in the setting dynamics in a low temperature range may be achieved by the embodiment of the clutch, namely in that the release distance is reduced for rising temperatures. For this purpose, the abutment position is displaced in the disengagement direction of the clutch (i.e., is moved away from the disks 18, 22 (FIG. 1)). In some arrangements, it may, however, be desired to bring about a reverse temperature compensation for the operating temperature range of the clutch such that the release distance of the clutch after reaching the operating temperature range is substantially independent of the temperature overall.

The problem of unwanted fluctuations of the setting path within the operating temperature range may result, for example, when the clutch housing 28 (FIG. 1) engages around the disk packet 18, 22 and the clutch actuator (e.g. piston 24) in the axial direction and is made of a material which has a higher thermal coefficient of expansion than the material of the clutch actuator. For example, the clutch housing 28 may be made of aluminum, whereas the piston 24 may be made of steel. An expansion of the clutch housing 28 in the axial direction caused by a temperature increase in this case effects an unwanted enlarging of the release distance and thus of the setting time since the piston 24 does not expand to the same degree in the axial direction.

Temperature compensation is also possible in this case due to the configuration of the clutch. FIG. 6 shows a possible configuration in a view corresponding to the representation in accordance with FIG. 2a. Unlike the configuration in accordance with FIG. 2a, here the slope 36 at the piston side is not provided at the radial outer side, but at the radial inner side of the piston 24, with the slope 36 again cooperating with a corresponding abutment slope 34 of the clutch housing 28. Conversely to the configuration in accordance with FIGS. 2a and 2b, a temperature increase now has the result that the abutment position of the piston 24 is displaced in the engagement direction (i.e., the piston 24 is urged out of the ring shaped cut-out 25). The enlargement of the axial expansion of the clutch housing 28 caused by temperature may hereby be compensated. The setting time is thus very largely independent of the temperature within the operating temperature range.

Provision may also be made for such a configuration that the respective sloping surface only cooperates with an edge (i.e., not necessarily with a complementary sloping surface) as was explained in connection with FIG. 5 (abutment edge 35). Furthermore, this configuration may also be provided for an abutment element 42 (FIGS. 3a to 3c) or for an adjustment element 46' (FIGS. 4a to 4d).

Where in the previously explained configuration, the respective pairing of the active thermal coefficients of expansion is swapped over, the alignment of the respective slope 34, 34', 36 must naturally also be adapted accordingly.

What is claimed is:

1. A multi-disk clutch having a plurality of interengaging disks movable along a longitudinal clutch axis and a resetting device for the mutual release of adjacent disks along a release distance that is bounded, the multi-disk clutch comprising:
an abutment device for bounding the release distance, the abutment device including at least one contact section of a clutch part movable along the longitudinal clutch axis and at least one contact section of an axially fixed clutch part, with the movable clutch part and the axially fixed clutch part having different thermal coefficients of expansion and with the contact sections of both parts cooperating such that the bounding of the release distance varies in dependence on temperature, with at least one of the contact sections having a sloping surface.

2. The multi-disk clutch in accordance with claim 1, wherein the thermal coefficient of expansion of the axially movable clutch part is lower than the thermal coefficient of expansion of the axially fixed clutch part, such that the bounded release distance increases with increasing temperature.

3. The multi-disk clutch in accordance with claim 1, wherein the contact sections have a rotationally symmetrical extent with respect to the longitudinal clutch axis.

4. The multi-disk clutch in accordance with claim 1, wherein the contact section of the axially movable clutch part and the contact section of the axially fixed clutch part are each formed by a respective sloping surface.

5. The multi-disk clutch in accordance with claim 1, wherein the contact section of the axially movable clutch part is formed by one of a sloping surface and an edge and the contact section of the axially fixed clutch part is formed by the other of the sloping surface and the edge.

6. The multi-disk clutch in accordance with claim 1, wherein the movable clutch part includes a substantially ring shaped actuable piston.

7. The multi-disk clutch in accordance with claim 6, wherein the piston is hydraulically actuable, with the contact sections being arranged within a hydraulic pressure space.

8. The multi-disk clutch in accordance with claim 1, wherein the axially movable clutch part is made as an abutment element which bounds the travel path of a piston movable along the longitudinal clutch axis.

9. The multi-disk clutch in accordance with claim 8, wherein the abutment element is ring shaped.

10. The multi-disk clutch in accordance with claim 1, wherein the axially fixed clutch part has a cut-out, with the axially fixed clutch part including at least one exchangeable adjustment element which is arranged in the cut-out.

11. The multi-disk clutch in accordance with claim 10, wherein the adjustment element has at least one expansion joint or interruption.

12. The multi-disk clutch in accordance with claim 1, wherein the clutch has a housing with a cut-out, with the axially fixed clutch part including at least one exchangeable adjustment element arranged in the cut-out, with the contact section of the axially fixed clutch part being formed at the adjustment element.

13. The multi-disk clutch in accordance with claim 12, wherein the adjustment element has at least one expansion joint or interruption.

14. The multi-disk clutch in accordance with claim 1, wherein the thermal coefficient of expansion of the axially movable clutch part is greater than the thermal coefficient of expansion of the axially fixed clutch part.

15. A multi-disk clutch having a plurality of interengaging disks movable along a longitudinal clutch axis and a resetting device for the mutual release of adjacent disks along a release distance that is bounded, the multi-disk clutch comprising:
an abutment device for bounding the release distance, the abutment device including at least one contact section of a clutch part movable along the longitudinal clutch axis and at least one contact section of an axially fixed clutch part associated with a cut-out in a clutch housing, with the movable clutch part and the axially fixed clutch part having different thermal coefficients of expansion and with the contact sections of both parts cooperating such that the bounding of the release distance is dependent on temperature and the cooperation of the contact surfaces, with at least the contact section of the movable clutch part having a sloping surface.

16. The multi-disk clutch of claim 15, wherein the contact section of the axially fixed clutch part includes a sloping surface on a radially inboard side of the clutch housing cut-out, and wherein the movable clutch part sloping surface is positioned on a radially inner side of the movable clutch part and is configured to engage the sloping surface of the cut-out, with the thermal coefficient of expansion being greater for the clutch housing than the movable clutch part such that as the clutch housing thermally expands in the axial direction, the contact section of the clutch housing cut-out is displaced toward the interengaging disks thereby compensating for temperature variation within an operating temperature range of the clutch and maintaining a release distance substantially independent of temperature within the operating temperature range.

17. The multi-disk clutch of claim 16, wherein the movable clutch part includes a ring shaped piston element.

18. The multi-disk clutch of claim 16, wherein the movable clutch part includes an abutment element which bounds the travel path of a piston movable along the longitudinal clutch axis, wherein the piston is positioned between the interengaging disks and the abutment element.

19. The multi-disk clutch of claim 15, wherein the sloping surface is positioned on a radially outboard side of the movable clutch part.

20. The multi disk clutch of claim 19, wherein the movable clutch part includes a ring-shaped piston element having the radially outboard sloping surface configured to engage a engage a corresponding sloping surface on a radially outboard side of the clutch housing cut-out, the clutch housing having a greater thermal coefficient of expansion than the piston element such that as the clutch housing thermally expands in the axial direction with rising temperature, the bounded release distance is increased.

21. The multi disk clutch of claim 19, wherein the movable clutch part includes an abutment element which bounds the travel path of a piston movable along the longitudinal clutch axis, wherein the piston is positioned between the interengaging disks and the abutment element.

22. The multi disk clutch of claim 21, wherein the abutment element is configured to engage a corresponding sloping surface on a radially outboard side of the clutch housing cut-out, the clutch housing having a greater thermal coefficient of expansion than the abutment element such that as the clutch housing thermally expands in the axial direction with rising temperature, the bounded release distance is increased.

23. The multi disk clutch of claim 21, wherein the axially fixed clutch part includes an exchangeable adjustment element removably positioned within the clutch housing cut-out, the contact section of the axially fixed clutch part including a radially inboard sloping surface formed at the adjustment element and configured to engage the sloping surface of the abutment element, with the clutch housing having a greater thermal coefficient of expansion than the abutment element such that as the adjustable element and housing thermally expand in the axial direction with rising temperature, the bounded release distance is increased.

24. The multi disk clutch of claim 21, wherein the axially fixed clutch part includes an adjustment element removably positioned within the clutch housing cut-out, the contact section of the axially fixed clutch part including an edge formed at a radially inboard edge of the adjustment element and configured to engage the sloping surface of the abutment element.

* * * * *